United States Patent [19]

Osawa et al.

[11] Patent Number: 4,921,933

[45] Date of Patent: May 1, 1990

[54] AROMATIC POLYAMIDE MOLDED ARTICLE HAVING STORAGE MODULUS

[75] Inventors: Masanori Osawa, Yokohama; Kohei Shizuka, Fujisawa; Masahiro Kouno, Ashigarashimo; Akio Matsuyama, Kamakura; Hirotoshi Katsuoka; Kazumi Mizutani, both of Yokohama, all of Japan

[73] Assignee: Mitsui Toatsu Chemicals, Incorporated, Tokyo, Japan

[21] Appl. No.: 199,910

[22] Filed: May 27, 1988

[30] Foreign Application Priority Data

Jun. 9, 1987 [JP] Japan ................................ 62-142301

[51] Int. Cl.$^5$ .............................................. C08G 69/32
[52] U.S. Cl. ..................................... 528/348; 528/349
[58] Field of Search ................................. 528/348, 349

[56] References Cited

U.S. PATENT DOCUMENTS

| | | | |
|---|---|---|---|
| 3,094,511 | 6/1963 | Hill et al. ............................ | 528/348 |
| 4,382,138 | 5/1983 | Paschke et al. ..................... | 528/348 |
| 4,384,112 | 5/1983 | Paschke et al. ..................... | 528/348 |

*Primary Examiner*—Harold D. Anderson
*Attorney, Agent, or Firm*—Oblon, Spivak, McClelland, Maier & Neustadt

[57] ABSTRACT

Aromatic polyamide having good high-temperature resistance and processing ability is obtained by specifying the ratio of storage modulus at the glass transition temperature (Tg)°C. to that of (Tg+100)°C.

7 Claims, No Drawings

AROMATIC POLYAMIDE MOLDED ARTICLE HAVING STORAGE MODULUS

BACKGROUND OF THE INVENTION

1. Field of the Invention

This invention relates to aromatic polyamide having excellent thermal resistance, and particularly relates to polyamide which retains elastic modulus even at high temperatures above the glass transition temperature of the same.

2. Description of the Prior Art

Polyamide is widely used in various fields such as industrial materials, protective clothings and interiors due to its excellent mechanical properties, thermal resistance, flame resistance, electrical properties and chemical stability. Aromatic polyamide which has been industrially manufactured and marketed to date is divided into two main classes. One is represented by so-called para-base aromatic polyamide such as poly(paraphenyleneterephthalamide) (hereinafter abbreviated as PPTA). It has characteristics of high crystallinity, high melting point, high mechanical strength, low elongation and high elastic modulus whereas has poor processing ability as a result of stiffness and low elongation. Since para-base aromatic polyamide is also slightly soluble in usual polar organic solvents such as dimethylformamide, dimethylacetamide and N-methylpyrrolidone, difficulty is encountered in film forming, spinning and other miscellaneous shaping processing. Therefore parabase aromatic polyamide is restricted in its application and only used as reinforcing filaments for tire cords, structural materials and composites.

The other is represented by so-called meta-base aromatic polyamide such as poly(metaphenyleneisophthalamide) (hereinafter abbreviated as PMIA). The meta-base polyamide has to some extent lower mechanical properties than para-base polyamide whereas has an excellent processing ability and is also soluble in the above polar organic solvents. Therefore meta-base polyamide can be applied for spinning and film casting, and is widely used for various fields such as flame retardant protective clothings and flameproof clothes, various industrial belts, heat resistant felt, and heat resistant insulation papers and adhesives.

PMIA, however, has lower crystallinity than PPTA and causes abrupt reduction in physical properties above the glass transition temperature Tg (above 220° C.). Accordingly, PMIA exhibits excellent properties at temperatures below Tg whereas causes particular problems at high temperatures above Tg. Even instantaneous use or application over a short period of time leads to shrinkage or a steep reduction in properties, thereby field of use has been restricted. As a countermeasure for the prevention of shrinkage, for example, a heat treatment method of PMIA fibers at high temperatures has been disclosed in Japanese Patent Publication No. 17692/1978. The method is unfavorable because deterioration on the surface of fibers and reduction in properties are resulted from the treatment. Besides, as a method of heat shrinkage prevention and chemical resistance enhancement for. films, film forming methods from a polymer solution containing a crosslinking agent has been disclosed in Japanese Patent Publication No. 110128/1980 and 13742/1980. However selection of the crosslinking agent and optimization of film forming conditions are difficult in these methods.

SUMMARY OF THE INVENTION

Object of the Invention:

The object of this invention is to provide aromatic polyamide which can be used up to higher temperatures by maintaining various advantages of PMIA as they are and by inhibiting above mentioned disadvantages, particularly lowering of properties at higher temperatures than Tg.

Disclosure of the Invention:

The present inventors have intensively investigated a variety of monomer combinations in the preparation of polymers in order to overcome aforesaid problems. As a result, they have found that aromatic polyamide consisting of a specific recurring unit and having a methyl side chain can form a film having almost no lowering of storage modulus at a temperature ranging from Tg ° C. to Tg+100° C. in the investigation of viscoelasticity. The above results have led to the completion of this invention.

This invention relates to polyamide comprising having a glass transition temperature of polymer ranging from not less than 250° C. to not more than 400° C. and that having a storage modulus of said polymer molding after heat treatment conducted at temperatures not less than the glass transition temperature, the modulus of which satisfies the formula (I):

$$\frac{E'(Tg)}{E'(Tg + 100° C.)} < 3$$

In the formula, symbols illustrate following properties.

Tg : Glass transition temperature (° C.)
E'(Tg): Storage modulus (Gpa) at the glass transition temperature
E'(Tg+100° C.): Storage modulus (Gpa) at Tg+100° C.

DETAILED DESCRIPTION OF THE INVENTION

Embodiments of the Invention:

In this invention, the ratio of storage modulus at the temperature of Tg to that of Tg+100° C. satisfies not more than 3, and more preferably not more than 2. It has been found that this ratio maintains thermal resistance of aromatic polyamide particularly by inhibiting the lowering of physical properties at high temperatures above Tg, thereby obtaining aromatic polyamide which can be used up to higher temperatures.

The ratio of storage modulus at the temperature of Tg to that of Tg+100° C. has been examined as a measure of judging various factors causing property reduction at high temperatures above Tg which is an disadvantage of PMIA.

The ratio has been larger than 3 in any case.

In this invention, attention has been focused on the ratio and aromatic polyamides have been investigated in order to satisfy the requirement that the ratio is not more than 3.

During the course of this investigation, methyl substituted aromatic polyamide having a Tg ranging from 250° C. to 400° C. and a specific structure of the formula (II) has been examined.

As a result, it has been found that the above requirement can be satisfied by subjecting the film prepared from said aromatic polyamide to heat treatment in the temperature range of Tg to Tg+150° C. and by measuring the viscoelasticity of resulting film.

As to the heat treatment method, the film is fixed between a certain distance and treated at a constant temperature not less than Tg and preferably within the range of Tg–Tg+150° C., for 1–100 minutes and preferably for 5–60 minutes.

It is preferred to treat in the range of Tg–Tg+150° C. with a temperature rise rate of 2–10° C./min.

Heat treatment is insufficient at temperatures below Tg and polymer deterioration occurs above Tg+150° C.

Therefore, good films can not be obtained in these cases.

Aromatic polyamide having a polymer Tg of not more than 250° C. is insufficient in stiffness of molecule and cannot provide a film having favorable high-temperature elastic modulus.

On the other hand, aromatic polyamide having a polymer Tg of not less than 400° C. is also disadvantageous in that the stiffness of molecule is too high or poor solubility in solvents makes the processing difficult.

As a result, it has been found that the above stated condition can be satisfied with polyamide consisting of specific structure represented by the formula (II).

$$[-HN-Ar1-NHCO-Ar2-CO-] \quad (II)$$

wherein Ar1 is a divalent phenylene group represented by

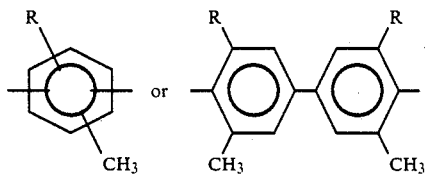

and Ar2 is a divalent phenylene group represented by

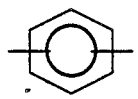

where R is hydrogen or a methyl group, and when said Ar1 is

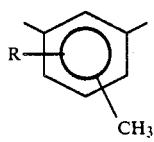

two carbon atoms directly bonded to nitrogen atoms of amide linkage in the phenylene group are situated in 2,4- or 2,6positions to methyl group, the ratio of said 2,4positions to 2,6-positions is in a range of from 100:0 to 80:20 or from 0:100 to 20:80, and two carbon atoms in the Ar 2 phenylene group directly bonded to carbonyl carbon atoms of the amide linkage are bonded in 1,3-or 1,4-positions in a ratio ranging from 0:100 to 20:80 or wherein Ar 1 is

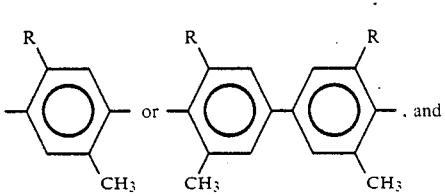

the two carbon atoms in the Ar 2 phenylene group directly bonded to carbonyl carbon atoms of the amide linkage are bonded in 1,3- or 1,4-positions in a ratio ranging from 100:0 to 80:20. The particularly preferred recurring unit of the formula (II) has one of the following structures.

(1) Not less than 95 mole % of the recurring unit is 4-methyl-1,3-phenyleneterephthalamide, (2) Not less than 95 mole % of the recurring unit is 2 methyl-1,4-phenyleneisophthalamide, (3) Not less than 95 mole % of the recurring unit is 2,5-dimethyl-1,4-phenyleneisophthalamide, or (4) Not less than 95 mole % of the recurring unit is 3,3'-dimethyl-4,4'-biphenyleneisophthalamide.

Any method can be employed for the preparation of films from aromatic polyamide of this invention. As a general method, for example, polyamide is dissolved in a polar organic solvent such as N-methylpyrrolidone and dimethylacetamide, casted on a glass plate, allowed to stand for 3 hours at 50°–80° C. in a hot air drying oven to obtain a self-supporting film containing 20–30 wt.% of the solvent.

The film is successively fixed on a pin tenter frame and dried by heating from the room temperature to 240° C. under reduced pressure.

Besides in the preparation of stretched film, the above self-supporting film is cut into a size of 5 mm×8 mm, fixed on a drawing machine and stretched 3–8 times at 70°–90° C. in a 10 wt.% aqueous N-methylpyrrolidone solution. The resulting film is successively dipped in a 5–10 wt.% aqueous N-methylpyrrolidone solution at 90°–100° C. for 5–60 minutes, washed thoroughly in a hot water stream at 60°–90° C. and further dried at 150° C. for 3 hours under reduced pressure of 2–3 mmHg to obtain a stretched film.

Storage modulus of the cast film or stretched film at Tg and Tg+100° C. can be obtained by measuring viscoelasticity from the room temperature to 450° C. Property of the stretched film is estimated by the formula (I).

Aromatic polyamide having the specific structure which satisfies this invention can be easily prepared by known methods. That is, aromatic diamine is reacted with aromatic dicarboxylic acid halide by low temperature solution polymerization, low temperature interfacial polymerization or fusion polymerization. Aromatic polyamide can also be prepared from aromatic diisocyanate and aromatic dicarboxylic acid by solution polymerization at high temperatures. Particularly preferred method is the high-temperature solution polymerization of aromatic diisocyanate and aromatic dicarboxylic acid in accordance with Japanese Laid-Open Patent No. 190517/1986 which was applied by the present inventors.

Aromatic diamines which is used as the raw material for preparing aromatic polyamide of this invention include, for example, tolylene-2,4-diamine, tolylene-2,6-diamine, 2-methyl-1,4-phenylenediamine and 2,5-dimethyl-1,4-phenylenediamine. Examples of aromatic dicarboxylic acid halides which is reacted with above diamines include isophthalic acid dihalide and terephthalic acid dihalide. Examples of aromatic diisocyanates which is suitably used in this invention include tolylene-2,4-diisocyanate, tolylene-2,6-diisocyanate, 2-methyl-1,4-phenylenediisocyanate and 2,5-dimethyl-1,4-phenylenediisocyanate. Aromatic dicarboxylic acid which is reacted with above diisocyanates includes, for example, isophthalic acid and terephthalic acid.

Polyamide of this invention can be used for various applications. Particularly preferred embodiments are such procedures as dissolving polyamide in the polar organic solvent, casting a film and further stretching the resulting film.

Effects of the Invention:

Aromatic polyamide of this invention which satisfies the formula (I) has very small lowering of storage modulus even at the high temperature region of $Tg+150°$ C. The polyamide is useful as fibers or films which are excellent in heat resistance and can be applied for various fields such as heat-resistant protective clothings, heat-resistant stretched film substrates, heat-resistant insulation films and thermal insulation films.

EXAMPLE

The embodiments of this invention will hereinafter be illustrated in detail by way of examples.

EXAMPLE 1

Preparation example of poly(4-methyl-1,3-phenyleneterephthalamide)

A 3 l separable flask equipped with a stirrer, thermometer, condenser, dropping funnel and nitrogen inlet tube was charged with 166.0 g (0.991 mole) of terephthalic acid, 2.038 g of mono potassium terephthalate and 1600 ml of anhydrous N,N'-dimethylethyleneurea in a nitrogen atmosphere. The mixture was heated to 200° C. with stirring and added dropwise with a solution of 174.0 g (0.9991 mole) of tolylene-2,4-diisocyanate in 160 ml of anhydrous N,N'-dimethylethyleneurea over 4 hours while maintaining the temperature. The reaction was further continued for an hour. The reaction mixture was cooled to the room temperature and poured into a poor solvent with vigorous stirring to precipitate white polymer. The polymer was washed with a large amount of water and dried at 150° C. for about 3 hours under reduced pressure. The inherent viscosity of the polymer thus obtained was 2.2 (95% $H_2SO_4$, 0.1%, 30° C.).

Preparation of a stretched film from poly(4-methyl-1,3-phenyleneterephthalamide)

Aromatic polyamide obtained above was dissolved in N-methylpyrrolidone to prepare a dope having a polymer concentration of 15 wt.%. The dope was casted on a glass plate to a thickness of 0.8 mm and pre-dried at 80° C. for 3 hours in a hot air oven to form a self-supporting film. Then the film was cut into 5 mm in width by 50 mm in length, set on a drawing machine, dipped in a 10 wt.% aqueous N-methylpyrrolidone solution at 70° C. and stretched 5 times at a rate of 30 mm/min. The stretched film was successively fixed in a prescribed length on a metal frame, dipped in a 10 wt.% aqueous N-methylpyrrolidone solution at 98° C. for 5 minutes, washed thoroughly in a warm water stream at 65° C. and dried at 150° C. under reduced pressure of 2-3 mmHg.

Glass transition temperature (Tg), melting point (Tm) and storage modulus (E') were determined by the following methods with the stretched film thus obtained.

Methods of determination

1. Glass transition temperature and melting point in accordance with Differential Scanning Calorimeter (DSC) method Glass transition temperature Tg (° C.)

Model DSC-2C of Perkin Elmer Co. is used. About 10 mg of film specimen is put in an aluminum sample disk and heated from the room temperature at a rate of 10° C./min in a nitrogen stream having a flow rate of 30 m/min to measure DSC curve. The temperature at which transfer of base line to endothermic side occures is designated as Tg.

Melting point Tm (° C.)

In the same method as above, the peak temperature of absorption peak at the high-temperature region above Tg is designated as Tm.

2. Storage modulus by viscoelasticity measurement

E'(Tg): Storage modulus (Gpa) at the glass transition temperature

RHEOVIBRON Model DDV-II-EA of Orientec Co. is used. A stretched film of 60 mm in length by 0.025 mm in thickness by 3.0 mm in width is held by chucks in a chuck distance of 16 mm. Viscoelasticity is measured under following conditions.

| Measuring Condition: | Frequency | 110 Hz |
|---|---|---|
| | Heating Rate | 2.0° C./min. |
| | Wave Width | $1.6 \times 10^{-3}$ cm |
| | (0.05% Dynamic strain to 3.2 cm specimen length) | |
| | Temperature Range from Ambient Temperature to 450° C. | |

Storage modulus at the glass transition temperature Tg is designated as E'(Tg).

E'(Tg+100° C.): Storage modulus (Gpa) at the temperature of Tg+100° C.

Viscoelasticity is measured by the same procedures as for E'(Tg). Storage modulus at the temperature of Tg+100° C. is designated as E'(Tg+100° C.).

Following results were obtained on the above stretched film in accordance with the aforesaid methods of determination. Tg was 320° C., and Tm was 425° C.

The stretched film obtained above was fixed between a prescribed distance and heat treated at 350° C. for 30 minutes. Storage modulus was measured at Tg and Tg+100° C., that is, 320° C. and 420° C. respectively. No change was found at all on storage modulus even at temperatures close to melting point.

$$E'(Tg) = E'(320° C.) = 2.1 \ (Gpa)$$

$$E'(Tg + 100° C.) = 2.3 \ (Gpa)$$

$$\frac{E'(Tg)}{E'(Tg + 100° C.)} = \frac{2.1}{2.3} = 0.91$$

The stretched film had a tensile strength of 1280 kg/cm² at 25° C. and 1015 kg/cm² at 300° C. respectively. Almost no change was found on the appearance of film after storage at 430° C. for 5 minutes.

EXAMPLE 2

Preparation example of poly(3,3'-dimethyl-4,4'-biphenyleneisophthalterephthalamide)

Polymerization was carried out by using the reaction vessel as Example 1. The vessel was charged with 132.9 g (0.8000 mole) of isophthalic acid, 33.22 g (0.2000 mole) of terephthalic acid, 2.010 g of mono potassium isophthalate and 2000 ml of anhydrous N,N'-dimethylethyleneurea in a nitrogen atmosphere. The mixture was maintained at 200° C. and added dropwise over 2 hours with a solution of 264.3 g (1.000 mole) of 3,3'-dimethyl-4,4'-biphenyldiisocyanate in 300 ml of anhydrous N,N'-dimethylethyleneurea. The reaction was further continued for 30 minutes. The reaction mixture was cooled to the room temperature and poured into a large amount of water with vigorous stirring to precipitate the polymer. The polymer was thoroughly washed with a large amount of hot water and dried at 150° C. for 10 hours under reduced pressure of 2–3 mmHg. The polymer had an inherent viscosity of 1.9.

Preparation of a stretched film from poly(3,3-dimethyl-4,4'-biphenyleneisophthal-terephthalamide)

A stretched film was prepared by the same procedures as Example 1, and Tg and Tm were measured respectively. Tg was 280° C. and Tm was 355° C. The stretched film obtained was fixed between a prescribed distance and heat treated at 300° C. for 60 minutes. The following storage moduli were obtained at Tg, that is, 280° C. and 380° C. respectively.

$$E'(Tg) = E'(T280° C.) = 2.2 \ (Gpa)$$

$$E'(Tg + 100° C.) = E'(T380° C.) = 1.9 \ (Gpa)$$

$$\frac{E'(Tg)}{E'(Tg + 100° C.)} = \frac{2.2}{1.9} = 1.2$$

The stretched film had a tensile strength of 1190 kg/cm$^2$ at 25° C. and 950 kg/cm$^2$ at 300° C. respectively. Almost no change was found on the appearance of film after storage at 430° C. for 5 minutes.

Control 1

Viscoelasticity of the stretched film obtained in Example 1 was measured without heat treatment. Storage modulus was measured at Tg (280° C.) and Tg+100° C. (380° C.).

$$E'(Tg) = E'(280° C.) = 2.2 \ (Gpa),$$

$$E'(Tg + 100° C.) = E'(380° C.) = 0.55 \ (Gpa),$$

$$\frac{E'(Tg)}{E'(Tg + 100° C.)} = \frac{2.2}{0.55} = 4.0$$

Steep reduction of storage modulus was found at temperatures above Tg. The stretched film shrank remarkably after standing at 430° C. for 5 minutes.

Control 2

Preparation example of poly(metaphenyleneisophthalamide)

A 2 l jacketed separable flask equipped with a stirrer, thermometer and jacketed dropping funnel was charged with 250.2 g (1.232 moles) of isophthalic acid chloride and 600 ml of anhydrous tetrahydrofuran. The solution obtained was cooled to 20° C. by introducing refrigerant into the jacket and added dropwise over 20 minutes under vigorous stirring with a solution of 133.7 g (1.237 moles) of metaphenylenediamine in 400 ml of anhydrous tetrahydrofuran. White emulsion thus obtained was quickly poured with vigorous stirring into ice cooled water containing 2.64 moles of anhydrous sodium carbonate. The temperature of slurry was risen close to the room temperature. After successively adjusting the pH to 11 with addition of sodium hydroxide, the slurry was filtered. The resulting cake was thoroughly washed with a large amount of water and dried overnight at 150° C. under reduced pressure. The inherent viscosity of polymer obtained was 1.4.

Preparation of a stretched film from poly(metaphenyleneisophthalamide)

A stretched film was prepared by the same procedures as Example 1. The film had a Tg of 280° C. and a Tm of 425° C. The following storage moduli were obtained at Tg and Tg+100° C., that is, 280° C. and 380° C. respectively.

$$E'(Tg) = E'(T280° C.) = 2.8 \ (Gpa)$$

$$E'(Tg + 100° C.) = E'(T380° C.) = 0.65 \ (Gpa)$$

$$\frac{E'(Tg)}{E'(Tg + 100° C.)} = \frac{E'(T280° C.)}{E'(T380° C.)} = 4.3$$

The stretched film had a tensile strength of 1310 kg/cm$^2$ at 25° C. and 780 kg/cm$^2$ at 300° C. The film caused severe shrinkage after standing at 430° C. for 5 minutes and could not be used.

Control 3

Preparation example of poly(4-methyl-1,3-phenyleneisophthalamide)

Polymerization was carried out by using the same equipment as Example 1. The separable flask was charged with 166.1 g (1.000 mole) of isophthalic acid, 0.9405 g of mono sodium isophthalate and 1000 ml of anhydrous N,N'-dimethylethyleneurea. The mixture was heated to 200° C. in an oil bath and added dropwise with a solution of 174.1 g (1.000 mole) of tolylene-2,4-diisocyanate in 200 ml of anhydrous N,N'-diethylethyleneurea over 4 hours while maintaining the temperature. The reaction was further continued for an hour. The reaction mixture was cooled to the room temperature and treated with the same procedures as Example 1. The polymer thus obtained had an inherent viscosity of 2.0.

Preparation of a stretched film from poly(4-methyl-1,3-phenyleneisophthalamide)

A stretched film was prepared by the same procedures as Example 1. The film had a Tg of 260° C. and a Tm of 395° C. The following storage moduli were obtained at Tg and Tg+100° C., that is, 260° C. and 360° C. respectively. Storage modulus was steeply dropped at the temperatures above Tg.

$$E'(Tg) = E'(T260° C.) = 2.0 \ (Gpa)$$

$$E'(Tg + 100° C.) = E'(T360° C.) = 0.5 \ (Gpa)$$

$$\frac{E'(Tg)}{E'(Tg + 100° C.)} = \frac{E'(T260° C.)}{E'(T360° C.)} = \frac{2.0}{0.5} = 4.0$$

The stretched film had a tensile strength of 1100 kg/cm$^2$ at 25° C. and 770 kg/cm$^2$ at 300° C. respectively. The stretched film shrank remarkably after standing at 430° C. for 5 minutes and could not be used.

What is claimed is:

1. A molded article of an aromatic polyamide, having a glass transition temperature ranging from not less than 250° C. to not more than 400° C. and having a storage modulus of said molded article, at a temperature not less than the glass transition temperature, defined by the formula (I):

$$E'(Tg)/E'(Tg+100°\ C.)<3 \qquad (I)$$

wherein Tg is the glass transition temperature ° C., E'(Tg) is the storage modulus in gigapascals at the glass transition temperature, and E'(Tg+100° C.) is the storage modulus in gigapascals at the temperature of Tg +100° C.

2. A molded article of an aromatic polyamide, having a glass transition temperature ranging from not less than 250° C. to not more than 400° C. and having a storage modulus of said molded article, which has been heat treated at a temperature ranging from not less than the glass transition temperature to not more than the glass transition temperature plus 150° C., defined by the formula (I):

$$E'(Tg)/E'(Tg+100°\ C.)<3 \qquad (I)$$

wherein Tg is the glass transition temperature in ° C., E'(Tg) is the storage modulus in gigapascals at the glass transition temperature, and E'(Tg+100° C.) is the storage modulus in gigapascals at the temperature of Tg +100° C.

3. The molded article of claim 2, wherein said molded article is a film made from an aromatic polyamide which consists of a recurring unit of the formula (II):

$$[-HN-Ar1-NHCO-Ar2-CO-] \qquad (II)$$

wherein Ar1 is a divalent arylene group represented by

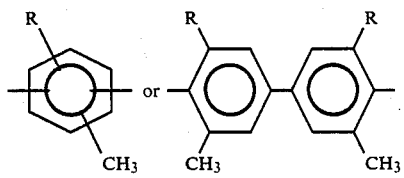

and Ar2 is a divalent phenylene group represented by

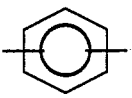

where R is hydrogen or a methyl group, and when said Ar1 is

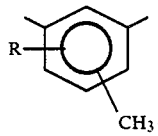

the two carbon atoms directly bonded to the nitrogen atoms of the amide linkage bonded to the phenylene group are situated in 2,4- or 2,6-positions to the methyl group, the ratio of said 2,4-positions to 2,6-positions is in a range of from 100:0 to 80:20 or from 0:100 to 20:80, and the two carbon atoms in the Ar2 phenylene group directly bonded to the carbonyl carbon atoms of the amide linkage are bonded in 1,3- or 1,4-positions in a ratio ranging from 0:100 to 20:80, or wherein Ar1 is

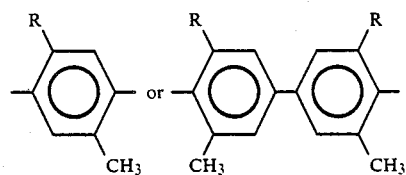

the two carbon atoms in the Ar2 phenylene group directly bonded to carbonyl carbon atoms of the amide linkage are bonded in 1,3- or 1,4-positions in a ratio ranging from 100:0 to 80:20.

4. The molded article of claim 1 wherein not less than 95 mole % of the recurring unit is 4-methyl-1,3-phenylene-terephthalamide.

5. The molded article of claim 1 wherein not less than 95 mole % of the recurring unit is 2-methyl-1,4-phenylene-isophthalamide.

6. The molded article of claim 1 wherein not less than 95 mole % of the recurring unit is 2,5-dimethyl-1,4-phenylene-isophthalamide.

7. The molded article of claim 1 wherein not less than 95 mole % of the recurring unit is 3,3'-dimethyl-4,4'-biphenyleneisophthalamide.

* * * * *